Dec. 21, 1954     C. S. SUNDLING     2,697,819
STORAGE BATTERY CABLE TERMINAL
Filed Sept. 22, 1952
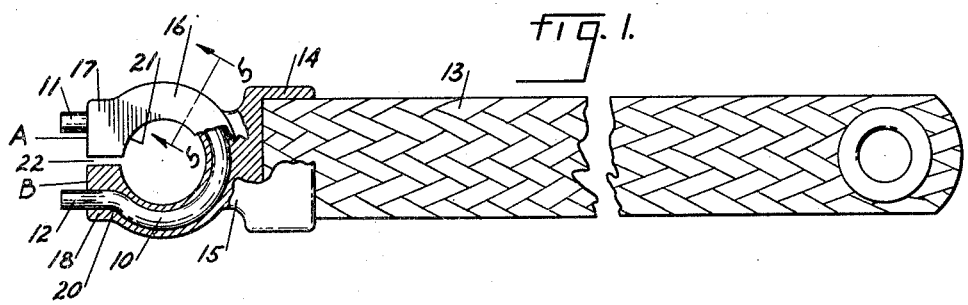
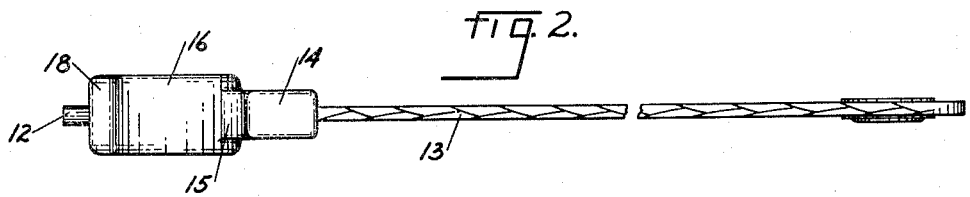
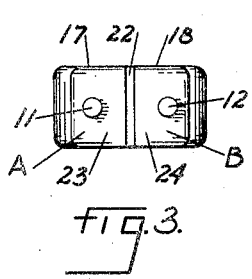
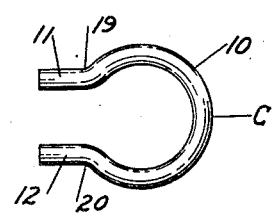
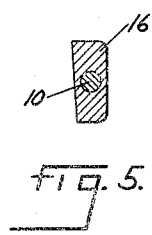
INVENTOR,
CARL S. SUNDLING,
BY Herbert Q. Minturn,
ATTORNEY.

— # United States Patent Office 2,697,819
Patented Dec. 21, 1954

2,697,819
STORAGE BATTERY CABLE TERMINAL

Carl Stanley Sundling, Mooresville, Ind.; Jane Sundling, administratrix of said Carl Stanley Sundling, deceased Application September 22, 1952, Serial No. 310,764

1 Claim. (Cl. 339—227)

This application is a continuation-in-part of my copending application Serial No. 211,330, filed February 16, 1951, and now abandoned, entitled Boltless Battery Cable Terminal. This invention relates to a boltless, spring operated, battery cable terminal for use on the standardized tapered posts of storage batteries.

A primary object of the invention is to provide a cable terminal which may be engaged with the battery post without use of bolts and at the same time have a contact resistance as between the terminal and the post equal to or less than the heretofore standardized bolt type terminal. A further object of the invention is to provide a structure which will be operable throughout not only the entire life of a single storage battery, but will be usable time and again such as will be required in the ordinary automobile where the ordinary battery is replaced every eighteen months to two years.

Heretofore, with the bolt secured type of cable terminal, the bolts have corroded to such an extent that it has been impossible to remove the bolts without cutting them, or the bolts have so corroded as to become entirely useless so that the cable terminal simply rests upon the posts without being clamped therearound under tension. In other words, the object of the invention is to eliminate the bolt element entirely and at the same time provide as good or better contact between the cable terminal and the battery terminal posts.

There is the additional advantage in the use of the invention herein shown and described in that the cable terminal may be applied to the battery posts simply by the use of a special pair of pliers spreading apart the terminal and dropping the terminal down over the posts and then removing the pliers.

These and many other objects and advantages of the invention will become apparent in the following description of one particular form as illustrated in the accompanying drawing, in which Fig. 1 is a top plan view in partial section of a structure embodying the invention;

Fig. 2 is a view in side elevation;

Fig. 3 is a view in front end elevation;

Fig. 4 is a view in top plan of the spring element; and

Fig. 5 is a vertical section on the line 5—5 in Fig. 1.

The illustration herein employed is that of a negative cable and terminal. In this form a strap cable is commonly used as illustrated. The positive cable terminal will be identical with the exception that the diameter through the terminal will be larger to receive the larger positive terminal posts of the storage battery therethrough as is common practice and well known to those versed in the art.

Referring first to Fig. 4, a spring element generally designated by the numeral 10 is formed to have a major circular portion. This element 10 is made of spring tension wire of .162 inch in diameter, and it is heat treated to give the desired hardness and required elasticity. The major portion of the spring element 10 is formed in a circle, the inside diameter of which is 13/16 inch. This is not a closed circle, however, since the ends 11 and 12 of the wire 10 are turned outwardly from the circular formation in parallel relationship to be spaced 7/16 of an inch apart. The length of each of these legs 11 and 12 is substantially 3/8 of an inch from the circular portion of the wire 10, as measured from the outside.

The wire 10 thus formed is placed in a suitable mold to be embedded in a lead alloy. This alloy is of low electrical resistance, and most importantly does not contain arsenic since that element has a tendency to harden the lead and make it brittle and readily breakable upon flexing. This alloy is cast about the wire 10 to have the wire centrally positioned in respect to its circular portion within the alloy. The external contour of the cast alloy is given the shape as it appears in Figs. 1, 2, 3, and 5 in the drawing. The exterior portion is essentially cylindrical, at least where it surrounds the circular portion of the wire 10.

At the same time the wire 10 is embedded in the lead alloy, the cable 13 is likewise bonded within the terminal lug 14, Figs. 1 and 2. A restricted neck portion 15 is provided between the lug 14 and the terminal proper 16.

The terminal 16 is cast to have the enlarged heads 17 and 18 respectively about the bends 19 and 20 between the legs 11 and 12 and the circular portion of the wire 10. A central, tapered bore 21 is provided vertically through the terminal 16, for the negative terminal having a top diameter of 5/8 inch and a bottom diameter of 11/16 inch to conform to the taper of the post on the storage battery. The overall vertical height of the terminal 16 is substantially 5/8 inch.

The two heads 17 and 18 are separated one from the other by a gap 22, 1/16 of an inch wide when cast. This gap 22 is centrally disposed between the wire legs 11 and 12.

The heads 17 and 18 have flat faces 23 and 24 each substantially 7/16 inch wide. Since the wire ends, that is the legs 11 and 12, are spaced 7/16 inch apart, these legs 11 and 12 will protrude through the faces 23 and 24 to one side of the central zone thereof in each instance. The legs 11 and 12 extend through these faces 23 and 24 at substantially right angles thereto. In so positioning the legs 11 and 12 in reference to the heads 17 and 18, there is a considerable mass of lead alloy A and B respectively presented on each side of the gap or slot 22 inside of the legs 11 and 12. The overall top diameter of the circular portion of the terminal 16 is approximately 1 3/16 inches. The gap 22 is centered on a radial line from the center of curvature of the bore 21 and the external surface of the terminal 16.

Two features are stressed in that the wire 10 is of quite small diameter, and that this wire 10 is spaced in the lead alloy an appreciable distance from the cable 13. It is intended that the lead alloy be the conductor of the electricity between the battery posts and the cable 13 and not through the wire 10. In the use of storage batteries, particularly in engine starting motors, the current flow from the battery will range from one hundred and sixty to three hundred or more amperes. If such a current flow is to be taken by a spring member, that spring member will eventually loose its tension under the current flow effect. Moreover, the round wire is found to be highly desirable in that when it is embedded in the lead alloy, and that alloy is cast around the spring member, there is not sufficient cross sectional area in the wire to have the wire retain any appreciable heat from the hot alloy, or at least long enough to destroy the characteristics obtained by the original heat treating of the spring member. In this regard, it is preferable that the alloy be not ladled or poured into the mold, but that the terminal be formed by a process where the alloy is forced into the mold under pressure and quickly cooled.

With a terminal 16 thus formed on the cable 13, exceedingly low resistance is afforded as between the battery terminal post and the cable 13.

When the terminal is first cast, the gap 22 has a dimension of 1/16 inch, but after the terminal has been spread apart, that is the terminal legs 11 and 12 spread apart to permit the bore 21 to be increased sufficiently to drop the terminal 16 onto the battery posts, and then these terminal legs 11 and 12 are released, the gap will return to the dimension of approximately 1/8 of an inch. This 1/8 inch gap is less than the gap will be when the terminal is applied to the posts, and therefore the fact that the terminal 16 does not return to its original cast and relaxed position does not affect the operation of the terminal in any way. With the terminal 16 thus formed in the proportions indicated, the area contact between the face of the bore 21 and the terminal 16 and the battery terminal post will extend approximately three hundred and thirty degrees around the post, that is, the complete circle less the width of the gap 22. This large degree of contact circumferentially around the post is as much and greater than some of the original equipment cable terminals heretofore employed.

In checking the electrical resistance between the battery terminal post and the cable 13, it has been found that this resistance would range from eight to thirty-one milliohms. The engineering department of a large automobile manufacturing companying has checked this matter of resistance. This engineering department sets up an acceptable maximum cable resistance of two hundred milliohms. The engineering department obtained results duplicating the range of resistances first above set out where the positive cable resistance ran from a minimum of sixteen to a maximum of thirty-one milliohms, and the negative cable resistance ran from eight to twenty-five milliohms, the lower resistance for the negative cable presumably being due to the fact that there is greater mass in this terminal of the negative cable since the negative battery post is smaller than the positive, and the external dimensions of the cable terminal are maintained the same for the negative as for the positive terminal.

In employing the invention, the exposed ends of the legs 11 and 12 are gripped by a special pair of pliers in a manner to spread them one apart from the other so as to increase the dimension of the gap 22 and therefore increase the effective diameter of the bore 21 throughout its vertical height. The pliers engaging the legs 11 and 12 and thus spreading them apart are held while the terminal 16 is placed down over the battery post, and when the terminal 16 is in its lowermost desired position, the pliers are released to let the legs 11 and 12 spring back under the tension of the spring member 10 to cause the lead alloy sheath to compressively grip the posts around the three hundred and thirty degrees of length of contact therewith. In this regard, it is to be noted particularly that the bending action of the spring 10 is confined largely to the spreading apart of the legs 11 and 12 from hinging zones on each side of and adjacent to the center C, Fig. 4. By reason of the massive construction of the heads 17 and 18, the wire 10 is held against bending in the bends 19 and 20, and the pliers are employed to spread apart the legs. In other words, the wire 10 is reinforced through the bends 19 and 20 so that the spring is limited to bending outside of those heads and therefore when the spring is spread apart, the bending will occur progressively between the bends 19 and 20 to the center C. There will be, thus, a division of the bending of the wire 10 so that there is a bending on each side of the center C, and all of the bending action is not taken to one side thereof, the zone C being that portion of the wire 10 which is anchored adjacent the neck 15 of the terminal 16. In other words, both legs 11 and 12 travel one relative to the other, so that one leg is not held stationary to require the other leg to do all of the traveling to increase the gap 22 in the attaching and detaching of the terminal from the battery posts.

Therefore, while I have described my invention in the one particular and precise form, structural changes may be employed without departing from the spirit of the invention, and I therefore do not desire to be limited to that precise form beyond the limitations which may be imposed by the following claim.

I claim:

A flexible battery cable terminal comprising a lead alloy body having a generally vertically cylindrical form with a central tapered bore therethrough; said body being split through on one side to leave a gap; a pair of heads integral with and enlarged from the body section, one head on each side of said gap; a cable mounting portion on the side of the body opposite said gap; a cable held in said portion; a neck between said body and said portion; a preheat-treated and tempered spring wire, circular in cross-section, embedded substantially centrally of said body both vertically and horizontally; said spring wire having a major circularly curved length centered on a center line through said neck and said gap; said spring wire further having a leg on each side extending through said heads from the circular length from bends therefrom into straight lengths parallel one with the other, each leg being spaced from said gap within and throughout its respective head a distance from the gap side greater than the spacing of the circular wire length from the face of said bore and extending by ends from those heads; said heads having lengths and widths along and about said legs to hold said legs substantially rigid against bending in said bends upon forcing apart and return travel of said legs; the central zone of said circular length opposite said legs being on said center line and being spaced from said cable a distance at least equal to the diameter of the wire; whereby by reason of said heads, the flexing of said wire will be confined to those portions thereof between said heads and said zone; the height of said body being approximately three and one-half times the diameter of said wire, and the diameter of the wire being approximately two-thirds of the minimum transverse thickness of the body on one side of said bore.

References Cited in the file of this patent

UNITED STATES PATENTS

| Number | Name | Date |
|---|---|---|
| 1,873,931 | Matsen | Aug. 23, 1932 |
| 2,085,497 | Hiebert | June 29, 1937 |
| 2,135,910 | Nelson | Nov. 8, 1938 |
| 2,215,416 | Wolcott | Sept. 17, 1940 |
| 2,602,105 | Welch | July 1, 1952 |

FOREIGN PATENTS

| Number | Country | Date |
|---|---|---|
| 757,413 | France | Oct. 9, 1933 |